United States Patent
Oliviero et al.

(10) Patent No.: US 6,368,037 B1
(45) Date of Patent: Apr. 9, 2002

(54) CARGO BAR WITH EASY RELEASE AND FORCE LIMITATION

(75) Inventors: Gian Carlo Oliviero; Jose Luis Alegre, both of Caracas (VE)

(73) Assignee: Multiprens C.A., Carretera (VE)

( * ) Notice: Subject to any disclaimer, the term of this patent is extended or adjusted under 35 U.S.C. 154(b) by 0 days.

(21) Appl. No.: 09/637,438

(22) Filed: Aug. 11, 2000

(51) Int. Cl.⁷ .................................................. B60P 7/15
(52) U.S. Cl. ...................................... 410/151; 410/143
(58) Field of Search ................................ 410/151, 143, 410/145, 149; 254/12, 95, 108, 247; 248/354.6, 354.7; 211/105.3, 105.5, 105.6; 74/141.5, 143, 167

(56) References Cited

U.S. PATENT DOCUMENTS

| | | | | |
|---|---|---|---|---|
| 4,781,499 A | * | 11/1988 | Wisecarver | 410/151 |
| 4,797,043 A | | 1/1989 | Williams, Jr. | 410/145 |
| 5,094,576 A | * | 3/1992 | Fredelius | 410/151 |
| 5,378,095 A | | 1/1995 | Shultz | 410/151 |
| 5,443,342 A | | 8/1995 | Huang | 410/151 |
| 5,769,580 A | | 6/1998 | Purvis | 410/151 |
| 5,833,414 A | | 11/1998 | Feldman et al. | 410/151 |
| 5,890,856 A | | 4/1999 | Huang | 410/151 |
| 5,944,464 A | | 8/1999 | Cole, Jr. | 410/153 |
| 5,947,666 A | * | 9/1999 | Huang | 410/151 |
| 5,988,963 A | | 11/1999 | Shiau | 410/151 |
| 6,186,715 B1 | * | 2/2001 | Oliviero | 410/151 |
| 6,210,090 B1 | * | 4/2001 | Wyse | 410/151 |
| 6,247,882 B1 | * | 6/2001 | Huang | 410/151 |

* cited by examiner

*Primary Examiner*—Stephen T. Gordon
(74) *Attorney, Agent, or Firm*—Shook, Hardy & Bacon L.L.P.

(57) ABSTRACT

A cargo bar of the type wedged in place in a cargo vehicle to prevent shifting of the cargo. A ratchet mechanism for extending the bar includes an advancement pawl, a release pawl and an eccentric ratchet head acting between the pawls. The ratchet head is connected with the ratchet housing by a pin fitting through an elongated slot. In normal operation, the ratchet head is limited in its movement by a projecting foot contacting the ratchet housing. To effect easy release of the cargo bar, the head can be shifted linearly as allowed by the slot and then pivoted further by the ratchet handle so that an angled surface on the head cams against the holding pawl to release it using the leverage of the handle. Force limitation is achieved by providing an extending collar on one bar which contacts the release pawl to prevent further reciprocation of the ratchet head when the maximum allowed force level is reached.

20 Claims, 1 Drawing Sheet

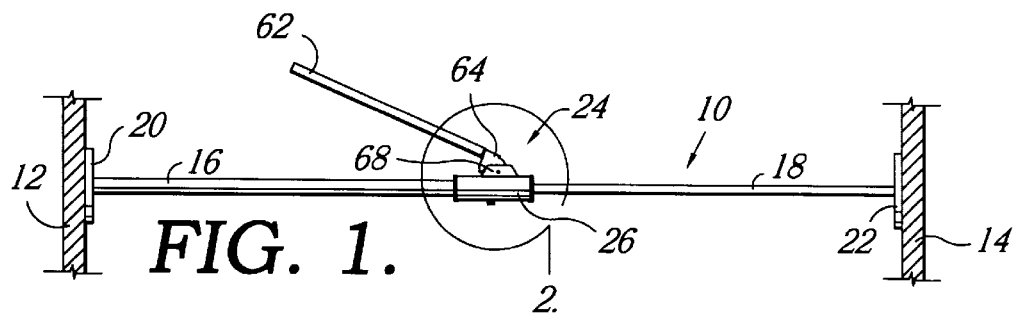
FIG. 1.
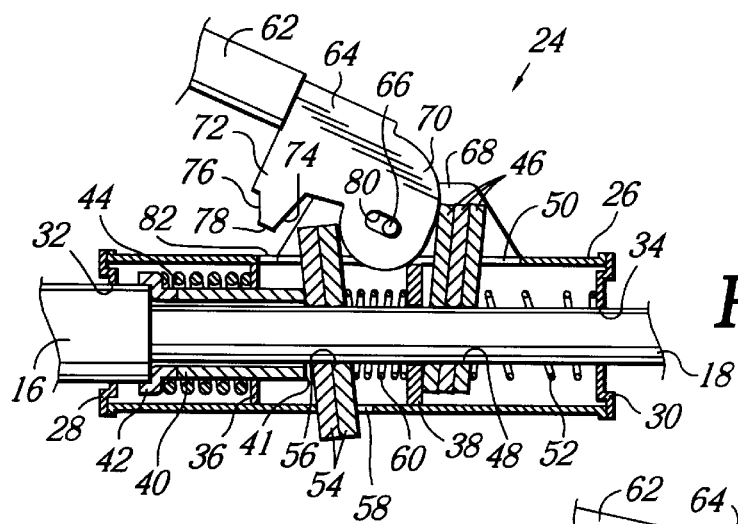
FIG. 2.
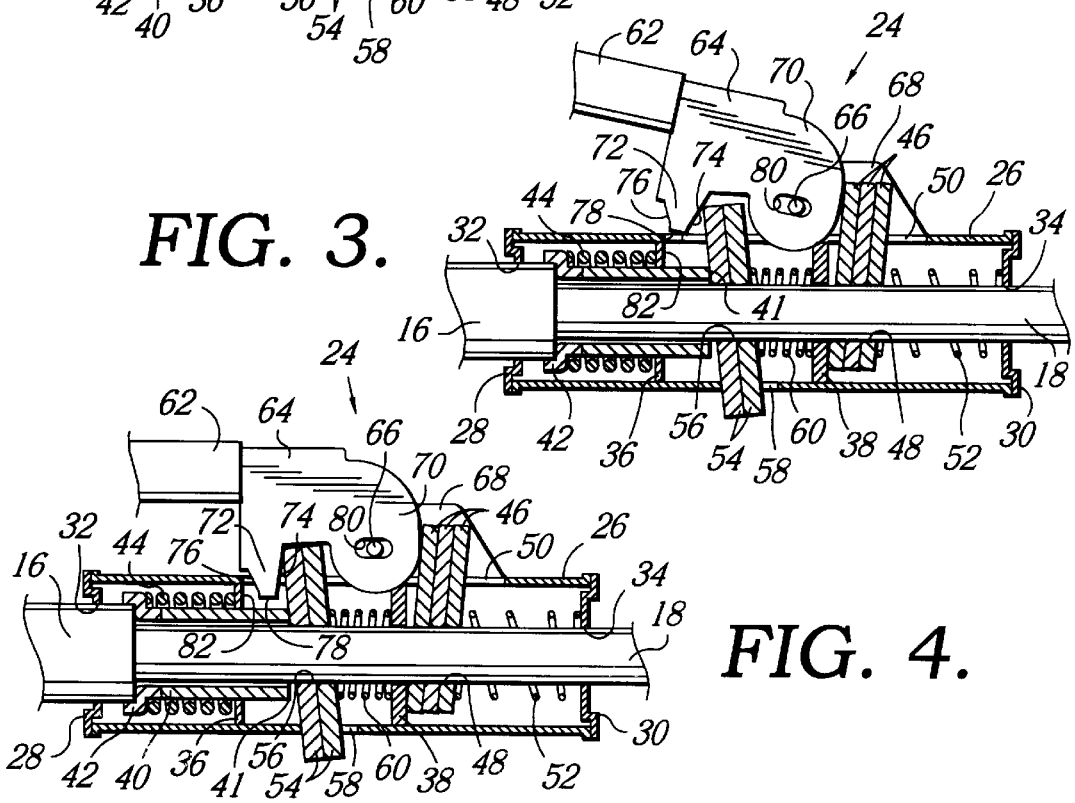
FIG. 3.
FIG. 4.

CARGO BAR WITH EASY RELEASE AND FORCE LIMITATION

FIELD OF THE INVENTION

This invention relates generally to cargo bars that are used to restrain freight in truck bodies and other vehicles. More particularly, the invention is directed to a cargo bar which is constructed so that it can be easily released and also to prevent excessive force from being applied by the bar.

BACKGROUND OF THE INVENTION

Freight vehicles such as over the road trailers and smaller trucks commonly use cargo bars which hold boxes and other freight containers in place. The cargo bar extends across the truck body between the opposite side walls and in some cases vertically between the floor and ceiling. It is placed where it acts as a barrier that prevents the cargo from shifting due to sudden starts and stops or other forces that may be encountered in transit.

In order to function effectively, the cargo bar must be wedged tightly in place so that it can withstand the forces that are exerted by the cargo. One commonly used type of cargo bar is constructed with pads on opposite ends of the bar which bear against the vehicle walls (or the floor and ceiling). A jack or ratchet mechanism operated by a reciprocating handle extends the bar to tightly secure it in place in extension between the walls or between the floor and ceiling. In a typical ratchet mechanism, one set of pawls advance the bar when the handle is reciprocated and another set of pawls hold the bar and prevent it from retracting before the next stroke is effected.

One of the principal problems with this type of cargo bar is that it is difficult to release. The bar is often necessarily tightened to the point where it exerts up to 300 pounds or even more to function adequately. In order to release the bar to permit the cargo to be unloaded, this force must be overcome with a greater force applied to the holding pawls. Often, a hammer or the like must be forcefully struck against the holding pawl to release them. This can cause injury to workers and damage to the pawls or other equipment and is burdensome in any event.

Another problem is that the ratchet can be operated so aggressively that it applies excessive force to the trailer walls. The walls can be bent or otherwise permanently damaged by the bar if this occurs. Although measures have been taken in the past to limit the force that can be exerted by the cargo bar, using hydraulic pressure relief or mechanical techniques, there is ample room for improvement to reduce the cost, complexity and reliability of the force limitation system.

SUMMARY OF THE INVENTION

The present invention is directed to a cargo bar in which the holding pawls are easily released and in which the force that can be applied by the bar is limited.

More particularly, it is an object of the invention to provide a cargo bar that is specially constructed to make use of the leverage of the ratchet handle for release of the holding pawls. In this regard, the ratchet head is pivoted to the ratchet housing through a slotted opening which allows the ratchet to be operated normally. When the cargo bar needs to be released, the slotted opening allows the ratchet head to be shifted to a release position where a strategically located angled surface of the ratchet head acts in camming fashion to release the holding pawls when the ratchet handle is further operated to pivot the ratchet head beyond its normal operating range.

Another important feature of the invention is an improved mechanism for limiting the force that can be applied by the cargo bar. This is accomplished by a spring loaded tubular collar which is mounted such that it progressively moves toward the holding pawls as the cargo bar is extended to exert increasing force. The spring which acts against the collar is selected so that it is compressed to exert the maximum allowable force (300 pounds, for example) at the point where the collar is butted up against the holding pawls. Thereafter, the collar provides a mechanical stop that prevents the ratchet head from pivoting in the area between the advancement pawls and the holding pawls. As a result, the ratchet can no longer be operated and the cargo bar cannot be extended beyond the length at which it applies the maximum allowable force.

Among the other objects of the invention are to provide a cargo bar of the character described which has a rugged construction, which is simple and economical to manufacture, and which functions reliably over an extended operating life.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary side elevational view showing a cargo bar constructed according to a preferred embodiment of the present invention extended between the opposite sidewalls of a vehicle body;

FIG. 2 is an enlarged fragmentary view, partially in section, showing the detail identified by numeral 2 in FIG. 1;

FIG. 3 is a fragmentary sectional view similar to FIG. 2, but showing the ratchet head reciprocated in normal operation to its extreme position wherein it abuts the ratchet housing; and FIG. 4 is a fragmentary sectional view similar to FIGS. 2 and 3, but showing the ratchet head pivoted beyond its normal operating position wherein it releases the holding pawls of the ratchet mechanism.

DETAILED DESCRIPTION OF THE INVENTION

Referring now to the drawings in more detail and initially to FIG. 1, numeral 10 generally identifies a cargo bar constructed in accordance with a preferred embodiment of the present invention. The cargo bar 10 is used in a cargo vehicle such as an over the road trailer having opposite side walls 12 and 14. The cargo bar 10 is extended between the side walls 12 and 14 to prevent cargo from within the vehicle body from shifting. Alternatively, the cargo bar 10 can be employed in a vertical position in which it extends between the floor and ceiling of the vehicle body to act similarly as a barrier preventing the cargo from shifting unduly during transit.

The cargo bar 10 is formed by a pair of separate bars 16 and 18 which carry respective pads 20 and 22 on their outer ends. The bars 16 and 18 are arranged in line, and the pads 20 and 22 bear against the respective side walls 12 and 14 of the vehicle body (or between the floor and ceiling) when the cargo bar 10 is in place. With additional reference to FIGS. 2–4, the cargo bar 10 includes a ratchet mechanism which is generally identified by numeral 24 and which operates to effect extension of the cargo bar 10. The ratchet mechanism 24 includes a ratchet housing 26 which is located at the junction or intersection between the two bars 16 and 18. Bar 18 is smaller than bar 16 and fits partially inside of bar 16 in telescopic fashion so that the ratchet mechanism 24 can be operated to extend bar 18 relative to bar 16, thus extending the overall length of the cargo bar 10 to wedge the cargo bar tightly in place between the side walls 12 and 14 (or between the floor and ceiling of the vehicle body).

The ratchet housing 26 may take the form of a square tube having end caps 28 and 30 on its opposite ends. Bar 16 extends out of the ratchet housing 26 through an opening 32 formed an end cap 28. The other bar 18 extends out of the ratchet housing through an opening 34 formed in the other end cap 30. The interior of the ratchet housing 26 is provided with a pair of partitions 36 and 38 which are spaced apart and which may be secured to the walls of housing 26 by welding or any other suitable manner. The inner end of bar 16 is provided with a tubular collar 40 which extends inwardly from the end of bar 16 around bar 18 such that bar 18 can slide axially within collar 40 as the cargo bar is extended and retracted. The collar 40 has a free end 41 and an enlarged flanged end 42 which is suitably secured to the end of bar 16 (as by welding, for example). The collar 40 extends freely through an opening formed in partition 36. A compression spring 44 is coiled around the body of collar 40 and acts against the partition 36 at one end and the flange 42 at the other end.

Three pawls 46 form an advancement pawl which is included in the ratchet mechanism 24 and which serves to advance bar 18 relative to bar 16 when the ratchet mechanism is operated. The pawls 46 are adjacent to one another and have openings 48 through which bar 18 extends. Bar 18 similarly extends through an opening in partition 38 which is adjacent to the pawls 46. The pawls 46 are flat plate elements that are adjacent to one another and extend through an opening 50 formed in the top wall of housing 26. The upper ends of the pawls 46 are thus located outside of the ratchet housing 26. The pawls 46 are located adjacent to partition 38 in the volume of the ratchet housing 26 between partition 38 and end cap 30. A compression spring 52 acts against the pawls 46 at one end and against the end cap 30 at the opposite end.

The ratchet mechanism 24 also includes a pair of holding pawls 54 which act together to form a holding pawl for the ratchet mechanism. The pawls 54 have openings 56 through which bar 18 extends. The pawls 54 are in the volume of housing 26 located between the partitions 36 and 38. Pawls 54 extend out of housing 26 at their top ends through the opening 50 and out of housing 26 at their lower ends through an opening 58 formed in the bottom surface of housing 26. A compression spring 60 is compressed between the pawls 54 at one end and partition 38 at the other end.

The ratchet mechanism 24 has an elongated handle 62 carrying a ratchet head 64 on one end. The ratchet head 64 has an irregular shape and is pivotally mounted to a horizontal pin 66 which extends between a pair of brackets 68 that are spaced apart and extend upwardly from the top of the ratchet housing 26. The ratchet head 64 is located between the brackets 68. The ratchet head 64 is formed on its free end as an eccentric cam 70 having a curved edge that is eccentric relative to the axis formed by pin 66. The head 64 also includes a projecting foot 72 which projects downwardly at a location spaced from the cam 70. The foot 72 has an angled surface 74 which faces the holding pawls 54. Another angled surface 76 is formed on the projecting foot 72 on the side opposite surface 74. A flat bottom surface 78 is formed at the bottom of the foot 72 and connects the two angled surfaces 74 and 76.

The cam 70 has an elongated opening or slot 80 through which pin 66 extends to mount the ratchet head 64 to the ratchet housing. The pin 66 is located such that the cam 70 operates in the space between the advancement pawls 46 and the holding pawls 54. The elongated shape of the slot 80 allows the ratchet head to shift on the pin 66 for a purpose that will be explained in more detail.

In use, the cargo bar 10 is extended between the opposite walls 16 and 14 of the vehicle body (or between the floor and ceiling). In order to secure the cargo bar 10 in place, the ratchet handle 62 is reciprocated to extend bar 18 relative to bar 16, thus increasing the overall length of the cargo bar to tightly wedge it between the walls 12 and 14.

As the ratchet mechanism 24 is operated, the advancement pawls 46 are skewed slightly such that they angle to the right from bottom to top. The spring 52 maintains the lower ends of the pawls 46 against the partition 38, while the cam 70 engages the upper portions of the pawls 46. The holding pawls 54 are skewed oppositely and angle slightly to the left from bottom to top. The spring 60 maintains the lower ends of pawls 54 against the left edge of opening 58. The upper ends of the pawls 54 are engaged by the cam 70.

During each upward stroke of the ratchet handle 62, the eccentric cam 70 is pivoted such that the upper end portions of pawls 46 and 54 are forced further apart. This forces the advancement pawls 46 to a more skewed position, and pawls 46 thus grip bar 18 and extend it to the right. The upper ends of the holding pawls 54 are forced to the left and allow bar 18 to extend to the right while biting into it to prevent it from retracting to the left. When the ratchet handle 62 is swung downwardly to complete the stroke, the holding pawls 54 act against bar 18 to hold it in place and prevent it from retracting.

During normal operation of the ratchet mechanism 24 in this manner, the bottom surface 78 of the projecting foot 72 contacts the top of ratchet housing 26 at portion 82 thereof adjacent to the opening 50 as shown in FIG. 3. The surface 82 thus serves as a stop that limits the downward pivoting of the lever 62 in normal operation.

When it is desired to remove the cargo bar 10, the holding pawls 54 must be released so that bar 18 can retract into bar 16. Release of the holding pawls 54 requires that their upper ends be forced to the right in order to overcome the tension force that is applied by the bar 10. In order to accomplish this, the handle 62 is pushed to the right far enough that the bottom surface 78 of foot 72 clears the surface 82 on housing 26 and can enter the opening 50. Shifting of the ratchet head 64 to the right is accommodated by the slot 80. The pin 66 is normally located in the right portion of slot 80 as shown in FIGS. 2 and 3 when the ratchet mechanism is operated normally. When the ratchet handle and head are moved to the release position of FIG. 4, the pin 66 is located in the left end portion of slot 80. The slip connection provided by the pin 88 and slot 80 allows the foot 72 to enter opening 50 and thus move downwardly farther than it can during normal operation of the ratchet mechanism.

Once the handle 62 has pushed the head 64 to the right far enough that foot 72 can clear the top of housing 26 and enter opening 50, the ratchet handle 62 can be moved further downwardly which causes the angled surface 74 to slide along the edge portion of one of the holding pawls 54. Due to the angled or inclined orientation of surface 74, its movement downwardly along the upper end portion of the pawls 54 forces the upper end portions of the pawls to the right by camming or wedging action which releases them from their holding position on the bar 18. Bar 18 is then freed and can retract into bar 16 so that the cargo bar 10 is released and can be removed. In this manner, the length of lever 62 is effectively used to provide leverage which allows the ratchet mechanism to be released easily and without the need to forcefully strike the holding pawls with a hammer or other tool.

The cargo bar 10 has a force limitation feature which is provided in part by the collar 40. As bar 18 is progressively extended relative to bar 16, the flange 42 becomes progressively closer to the partition 36, thus progressively compressing spring 44. Spring 44 is selected such that when a maximum allowable force (300 pounds, for example) is applied by the cargo bar 10, the free end 41 of collar 40 is butted against the closer holding pawl 54, as shown in FIG. 3. Once the end of collar 40 is butted against pawl 54, the upper ends of pawls 54 cannot be forced to the left due to the interference of the collar 40. Consequently, the eccentric cam 70 has insufficient space in which to operate between the pawls 46 and 54, and the ratchet mechanism is prevented from operating to further extend the bar 18. In this manner, once the desired maximum force limit is reached, the ratchet mechanism 24 cannot be operated in order to increase the force applied by the cargo bar 10. As a result, undue force cannot be applied by the cargo bar to possibly damage the vehicle walls 12 and 14.

It should be understood that the easy release feature exhibited by the cargo bar of the present invention can be provided without the force limitation feature. Conversely, the force limitation feature can be provided separately and independently from the easy release feature. However, the easy release feature and the force limitation feature can be conveniently and effectively combined in a single unit, and it is thus preferred that the cargo bar 10 be provided with both features in combination.

It should also be understood that the ratchet mechanism may be provided with any desired number of advancement pawls 46 or any desired number of holding pawls 54, and that the construction and shape of the pawls can be varied without detracting from the benefits of the present invention.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A cargo bar assembly for restraining cargo in a vehicle body, comprising:
   first and second bars arranged substantially in line to extend between opposite ends of the cargo bar assembly;
   a ratchet housing at an intersection between said first and second bars;
   an advancement pawl in said ratchet housing for advancing said first bar to increase the length of the cargo bar assembly between said opposite ends thereof;
   a holding pawl in said ratchet housing for holding said first bar to prevent retraction thereof relative to said second bar, said holding pawl being adjustable to a release position wherein retraction of said first bar is permitted;
   a ratchet handle having a head for operating said advancement pawl, said head being connected with said ratchet housing for reciprocating pivotal movement about a pivot axis to operate said advancement pawl in a manner to advance said first bar;
   a stop for normally preventing said head from pivoting beyond a prescribed position, said head being selectively adjustable to bypass said stop to permit the head to pivot beyond said prescribed position; and
   said head being arranged to effect release of said holding pawl upon pivoting of the head beyond said prescribed position.

2. A cargo bar assembly as set forth in claim 1, including a slip connection between said head and housing allowing said head to slip in a manner to bypass said stop.

3. A cargo bar assembly as set forth in claim 1, including a surface on said head located to act against said holding pawl by camming action when said head is pivoted beyond said prescribed position.

4. A cargo bar assembly as set forth in claim 3, including a slip connection between said head and housing allowing said head to slip in a manner to bypass said stop.

5. A cargo bar assembly as set forth in claim 1, including a pin fitting through an elongated slot for pivotally connecting said head to said ratchet housing for reciprocating pivotal movement about said pin.

6. A cargo bar assembly as set forth in claim 5, including a surface on said head located to act against said holding pawl by camming action when said head is pivoted beyond said prescribed position.

7. A cargo bar assembly as set forth in claim 1, including a pin on said ratchet housing providing said pivot axis and an elongated slot on said head through which said pin extends to connect said head to said housing for reciprocating pivotal movement, said pin moving linearly in said slot to allow said head to be adjusted to bypass said stop.

8. A cargo bar assembly as set forth in claim 7, including a surface on said head located to act against said holding pawl by camming action when said head is pivoted beyond said prescribed position.

9. A cargo bar as set forth in claim 1, including:
   a stop element on said second bar extending around said first bar and having an end normally spaced from said holding pawl;
   an eccentric portion of said head operable between said advancement pawl and holding pawl; and
   a compression spring acting between said ratchet housing and said stop element to allow movement of said stop element toward said holding pawl upon application of compressive force between said opposite ends of the cargo bar assembly, said spring exerting a compressive force at a predetermined level when said stop element has moved into abutment with said holding pawl to thereafter prevent eccentric pivoting of said head between the advancement and holding pawls.

10. A cargo bar assembly for restraining cargo in a vehicle body, comprising:
   first and second bars arranged in line to extend between opposite ends of the cargo bar assembly;

a ratchet housing at an intersection between said first and second bars;

an advancement pawl in said ratchet housing for advancing said first bar to increase the length of the cargo bar assembly between said opposite ends thereof;

a holding pawl in said ratchet housing for holding said first bar to prevent retraction thereof relative to said second bar, said holding pawl being adjustable to a release position wherein retraction of said first bar is permitted;

a ratchet handle having a head connected with said ratchet housing for reciprocating pivotal movement in normal operation to operate said advancement pawl in a manner to progressively extend said first bar relative to said second bar;

a stop located to prevent said head from pivoting beyond a prescribed position in normal operation;

a slip connection between said head and ratchet housing allowing adjustment of said head to an abnormal position wherein the head can pivot beyond said prescribed position; and a surface on said head located and arranged to effect release of said holding pawl when said head is pivoted beyond said prescribed position.

11. A cargo bar as set forth in claim 10, including:

a stop element on said second bar extending around said first bar and having an end normally spaced from said holding pawl; and an eccentric portion of said head operable between said advancement pawl and holding pawl; and a compression spring acting between said ratchet housing and said stop element to allow movement of said stop element toward said holding pawl upon application of compressive force between said opposite ends of the cargo bar assembly, said spring exerting a compressive force at a predetermined level when said stop element has moved into abutment with said holding pawl to thereafter prevent eccentric pivoting of said head between the advancement and holding pawls.

12. A cargo bar as set forth in claim 10, wherein said slip connection comprises a pin on said housing and an elongated slot on said head through which said pin extends to connect said head to said housing for reciprocating pivotal movement about an axis of the pin, said pin moving linearly in said slot to allow adjustment of said head to said abnormal position.

13. A cargo bar as set forth in claim 12, wherein said surface acts against said holding pawl by camming action to effect release thereof when said head is pivoted beyond said prescribed position.

14. A cargo bar as set forth in claim 10, wherein said surface acts against said holding pawl by camming action to effect release thereof when said head is pivoted beyond said prescribed position.

15. A cargo bar as set forth in claim 10, including a projecting foot extending from said head for engagement with said stop, said surface being located on said foot.

16. A cargo bar as set forth in claim 15, wherein said surface acts against said holding pawl by camming action to effect release thereof when said head is pivoted beyond said prescribed position.

17. A cargo bar assembly for restraining cargo in a vehicle body, comprising:

first and second bars arranged in line to extend between opposite ends of the cargo bar assembly;

a ratchet housing at an intersection between said first and second bars;

an advancement pawl in said ratchet housing for advancing said first bar to increase the length of the cargo bar assembly between said opposite ends thereof;

a holding pawl in said ratchet housing for holding said first bar to prevent retraction thereof relative to said second bar, said holding pawl being adjustable to a release position wherein retraction of said first bar is permitted;

a ratchet handle having an eccentric head pivotally mounted to said ratchet housing and operable between said advancement pawl and holding pawl for eccentric pivoting to push said pawls apart in a manner to extend said first bar relative to said second bar;

a stop element on said second bar extending around said first bar and having an end normally spaced from said holding pawl; and a compression spring acting between said ratchet housing and said stop element to allow movement of said stop element toward said holding pawl upon application of compressive force between said opposite ends of the cargo bar assembly, said spring exerting a compressive force at a predetermined level when said stop element has moved into abutment with said holding pawl to thereafter prevent eccentric pivoting of said head between the advancement and holding pawls.

18. A cargo bar assembly as set forth in claim 17, wherein:

said head is arranged to engage said housing to prevent said head from pivoting beyond a prescribed position in normal operation;

said head can be shifted to an abnormal position wherein said head can pivot beyond said prescribed position; and said head is arranged to effect release of said holding pawl when pivoted beyond said prescribed position.

19. A cargo bar assembly as set forth in claim 18, including a pin on said housing and an elongated slot on said head through which said pin extends to connect said head to said housing for reciprocating pivotal movement about said pin, said pin moving linearly in said slot to allow said head to be shifted to said abnormal position.

20. A cargo bar as set forth in claim 17, wherein said stop element comprises a collar extending from said second bar around said first bar.

\* \* \* \* \*